July 2, 1968  H. D. DEHNE  3,390,776
REACTOR FOR THE TREATING OF WATER
Filed Oct. 20, 1965  4 Sheets-Sheet 1

INVENTOR
HANS D. DEHNE
BY
ATTORNEYS

INVENTOR
HANS D. DEHNE
BY
ATTORNEYS

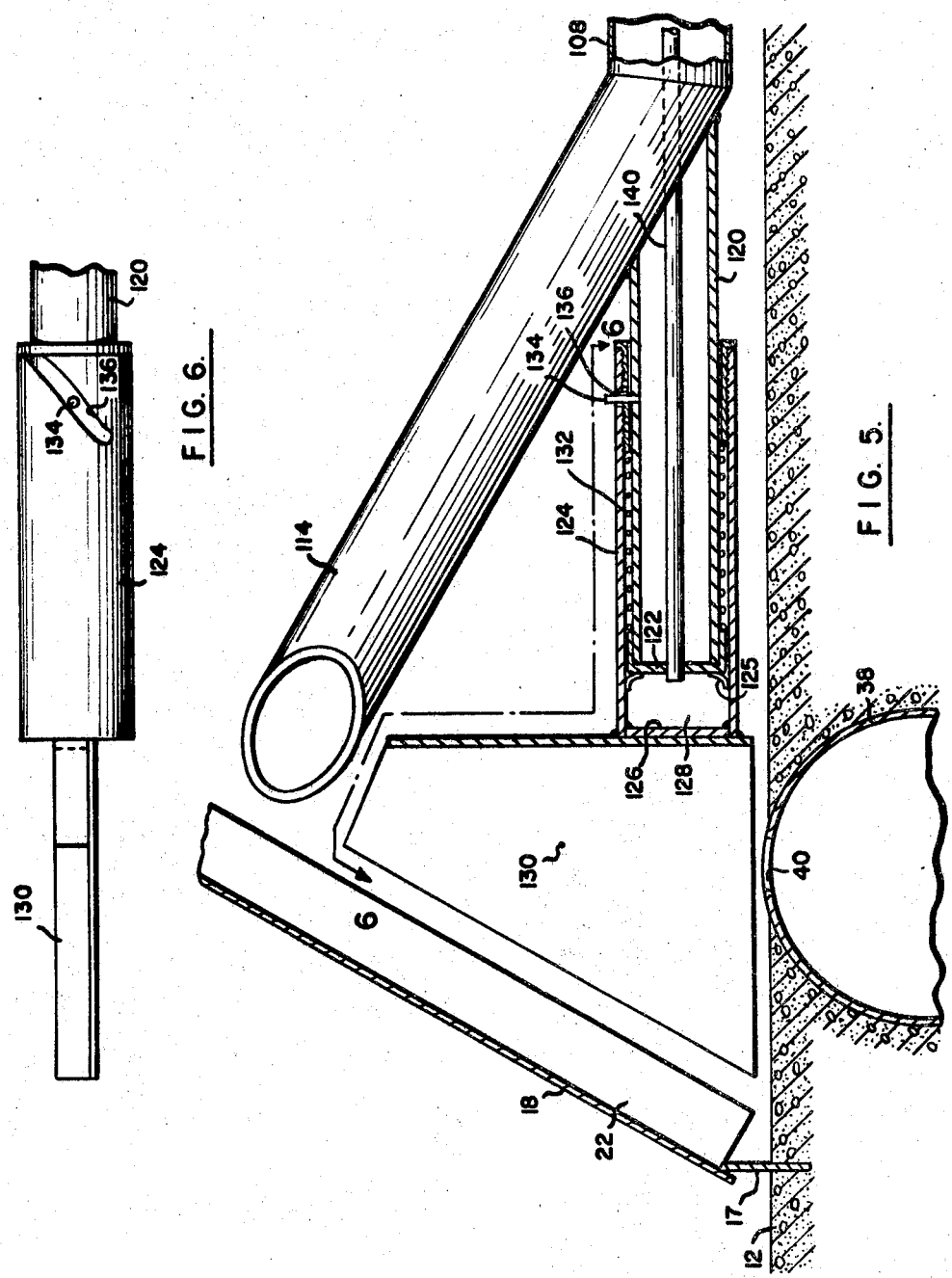

United States Patent Office 3,390,776
Patented July 2, 1968

3,390,776
REACTOR FOR THE TREATING OF WATER
Hans D. Dehne, King of Prussia, Pa., assignor to Crane Co., Chicago, Ill., a corporation of Illinois
Filed Oct. 20, 1965, Ser. No. 498,385
12 Claims. (Cl. 210—208)

ABSTRACT OF THE DISCLOSURE

A reactor for the treatment of water comprising clearly separated zones for the mixing of raw water with the chemicals and sludge, for precipitation, and for settling, the reactor involving a hydraulic arrangement for mixing and distributing the chemicals in the raw water.

---

This invention relates to reactors of the type used for the purification, clarification, and/or softening of water.

In water treatment reactors of the indicated type there is involved the adding, mixing, precipitating and separating of chemicals and impurities in the raw water within reactor tanks. Optimum performance can be obtained in reactors of the indicated type when the supply of raw water, the adding and mixing of the chemicals, the recirculation of sludge supporting the feeding process for precipitation, the settling of the precipitation, and the discharge of the treated water are equally effective and uniform at each location within the reactor designed for the specific function. Moreover, it is desirable that any step during the water treatment process there be no disturbance or hindrance by any other preceding or succeeding step. Moreover, it is desirable that the amount of chemicals and other fluids can be controlled as desired in accordance with the flow and quality of the raw water supply as this varies.

The water treatment reactors presently known cannot achieve the above-discussed desirable objectives. These prior devices do not involve clearly separated zones for various treatment steps mentioned above, namely, mixing, precipitating and settling, and do not provide the possibility of unrestricted control of treating process.

It is the object of this invention to provide a reactor which can achieve the above-discussed objectives by providing exactly defined zones for the several phases of the process, providing a simple method for the mixing and distributing of the chemicals in the raw water, and by providing practically unrestricted control of the process of treatment.

Another object of the invention is to provide a simple hydraulic method of mixing and distributing the chemicals in the raw water and to provide a mixing chamber having a simple shape and construction which minimizes costs. The above and other objects and features of the invention will become apparent from a consideration of the following description when taken in conjunction with the accompanying drawings, in which:

FIGURE 5 is an enlarged view of another detail of the invention; and

FIGURE 6 is a view taken on the line indicated at 6—6 of FIGURE 5.

Figure 1:
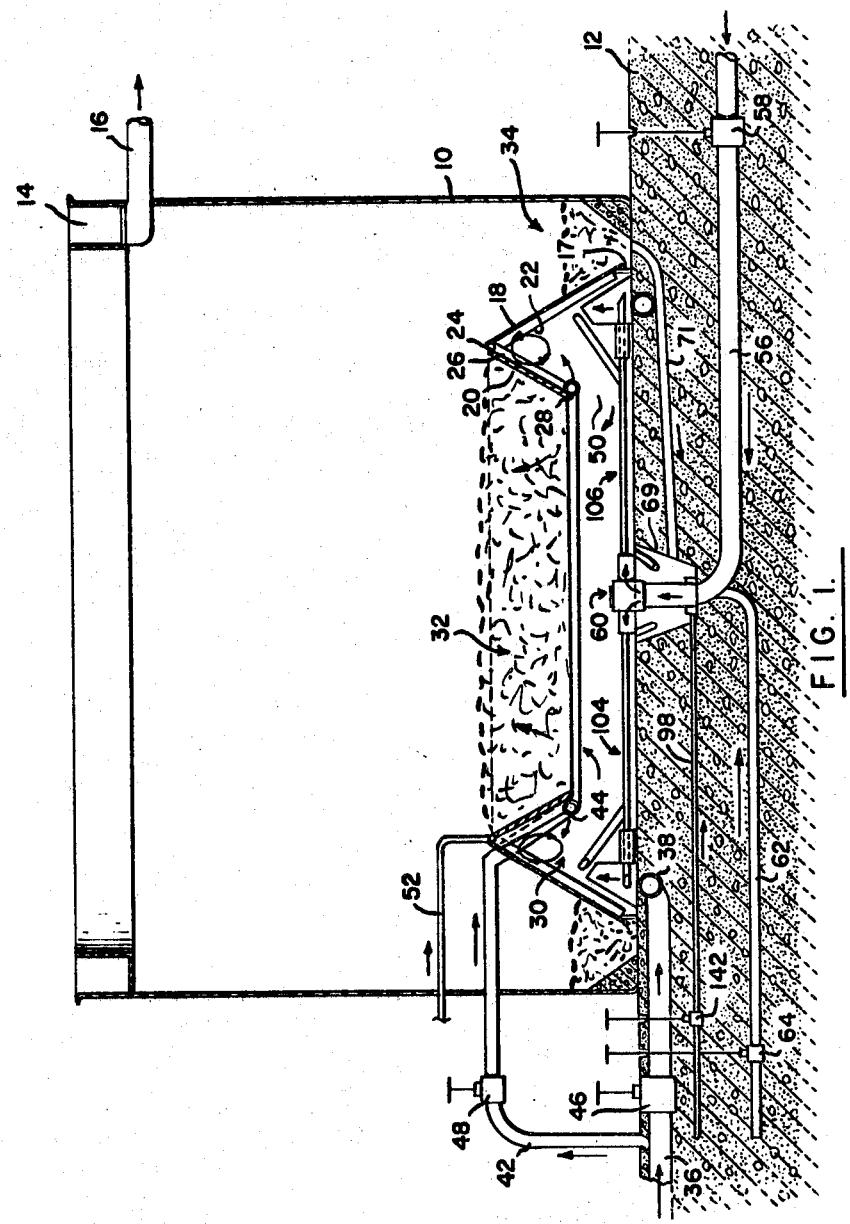
FIGURE 1 is an elevation of a water treatment reactor in accordance with the invention with various parts shown in section and diagrammatically for clarity of illustration.

The reactor in accordance with the invention comprises a cylindrical tank 10 supported at grade level on a bed of concrete 12 forming the tank bottom. At its upper end tank 10 has the usual off-take launder 14 by which the treated effluent leaves the reactor. The effluent leaves the launder 14 by way of an outlet pipe 16 shown in FIGURE 1. A support ring 17 is embedded in the bottom 12 of the tank 10. Mounted on ring 17 is a pair of conical hoods 18 and 20 diverging in opposite directions from an apex.

The conical hoods 18 and 20 are supported on a skeleton or framework comprising a first series of circumferentially spaced supporting ribs 22 welded at their upper ends to a circular pipe 24 located at the apex of the hoods 18 and 20. At their lower ends the ribs 22 are supported on the ring 17. These circumferentially positioned ribs 22 provide support for the outer hood 18 which desirably comprises a plurality of curved plates placed in end-to-end relationship to form the outer conical hood configuration. The hood supporting framework also comprises a plurality of ribs 26 circumferentially spaced around the hood 20. The ribs 26 are welded at their upper ends to the circular pipe 24 and at their lower ends to a circular pipe 28 concentric with the pipe 24 and inwardly thereof. The ribs 26 thus provide a support for the inner hood 20 which, like the outer hood 18, may be constructed of a plurality of curved plates placed in end-to-end relationship to form the conical shape.

As shown in FIGURE 1, the outer hood 18 extends from the apex down to the bottom of the tank 10 whereas the inner hood 20 terminates at a location substantially above the tank bottom. It will be apparent that the above-described conical hood construction defines various spaced zones within the reactor tank 10. For example, in the annular space between opposed portions of the hoods 18 and 20 there is defined a zone 30 which, as will appear hereafter, will serve as a mixing zone. Also in the conical space within the inner hood 20 there is defined a zone 32 which will provide a region where the sludge blanket for the reactor will be formed. Furthermore, in the space between the outer hood 18 and the inner wall of the tank 10 there is defined an annular zone 34 which, as will appear hereafter, will provide a location where a dense sludge may accumulate.

Raw water is delivered to the reactor by a supply pipe 36 which communicates at its downstream end with a circular distributing pipe 38. The pipe 36 is shown as being embedded within the concrete bed 12, however, it may be located above grade if desired. The circular distributing pipe 38 is located within the hood 18 below the mixing chamber 30, as is best shown in FIGURE 1, and is provided with a plurality of circumferentially spaced holes 40 in the upper portion thereof as shown in FIGURE 5. A pipe 42 branches off the pipe 36 and communicates at its downstream end with the circular pipe 28 to provide a second raw water supply conduit. The pipe 28 is provided with a plurality of circumferentially spaced holes 44 extending in a plane slightly above the horizontal and directed toward the mixing chamber 30.

The pipes 36 and 42 are provided with flow regulating valves 46 and 48, respectively, for regulating the flow of raw water as desired. During operation, the raw water is supplied at a predetermined velocity for generating a vortex flow rotating in vertical planes within the mixing chamber 30 as is best shown by the arrows in FIGURE 1. Desirably, the flow in each vertical plane will be such that the raw water rotates several times before it leaves the mixing zone 30 by flowing downwardly and through the opening 50 at the lower end thereof between the tank bottom and the lower end of the inner hood 20. It will be noted that the raw water leaving the mixing zone 30 will flow upwardly through the zone 32 provided for the sludge blanket as will be described more fully hereafter.

There is provided various supply means for delivering reacting chemicals into the mixing chamber for admixture with the raw water. These chemicals may be of any suitable type employed in present water treatment reactors, as for example, aluminum sulfate, lime, and magnesium. One supply line for the chemicals is provided by the pipe 52 which communicates at its downstream end with the circular pipe 24. Pipe 24 is provided with downwardly extending openings throughout the circumferential extent thereof whereby the chemicals are directed into the mixing chamber 30 in a downward direction. The chemical supply provided by the pipe 52 is only of a secondary type, the primary chemical supply being provided by a distributing means located in the bottom of the tank within the hood construction.

Figure 3:
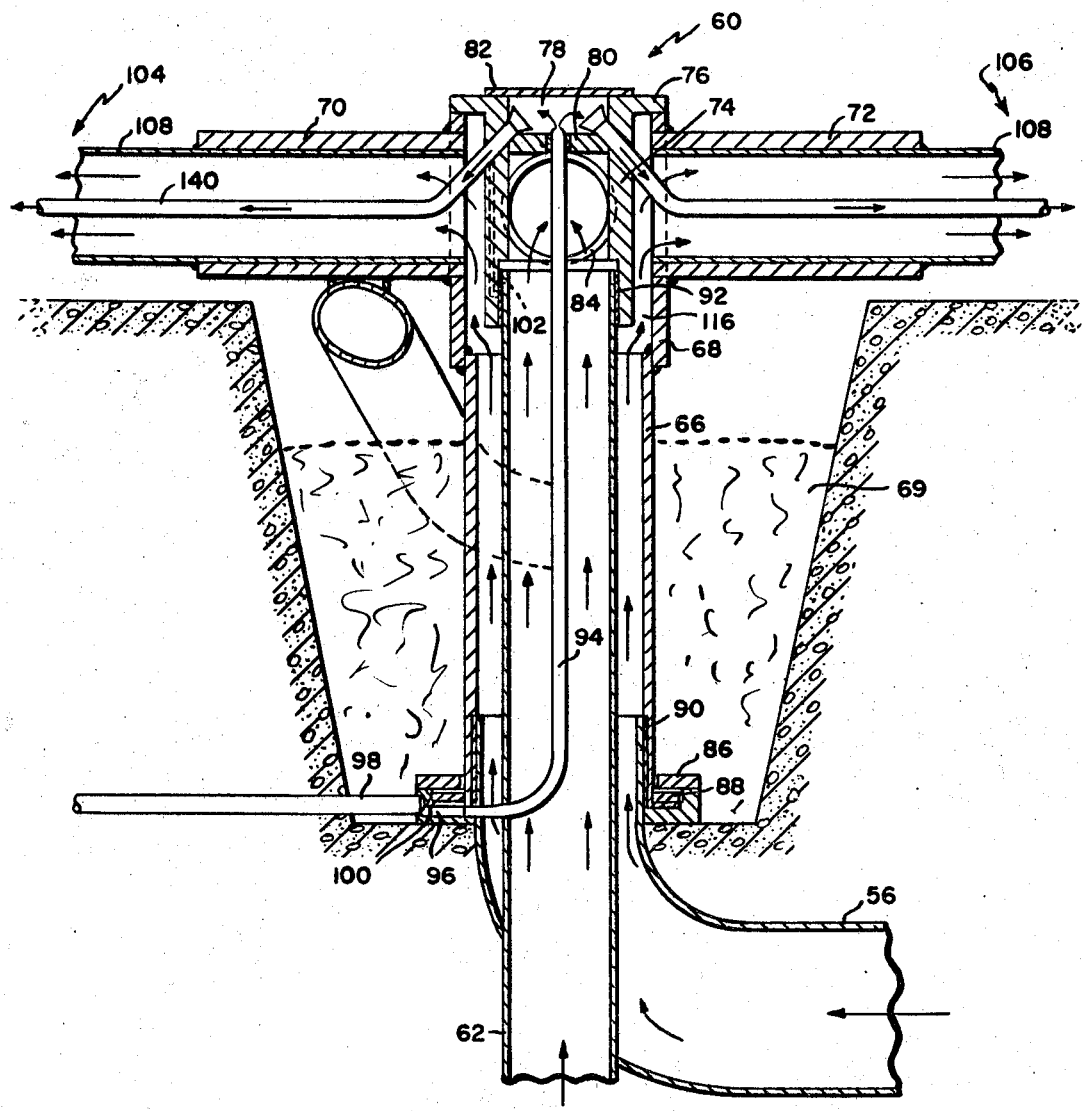
FIGURE 3 is an enlarged sectional view in elevation of a detail of the invention.

The distributor serves to deliver two chemicals to the mixing chamber 30. To this end, chemicals are supplied by way of a line 56 which contains a regulating valve 58 and terminates at its downstream end at the bottom of a supply head 60 as is best shown in FIGURE 3. A third chemical supply is provided by the line 62 which has a regulating valve 64 therein and terminates at its downstream end at an upper portion of the head 60 as is best shown in FIGURE 3. The chemicals supplied through lines 56 and 62 will be distributed to the reactor by the distributor arms in a manner to be described more fully hereafter.

Figure 4:
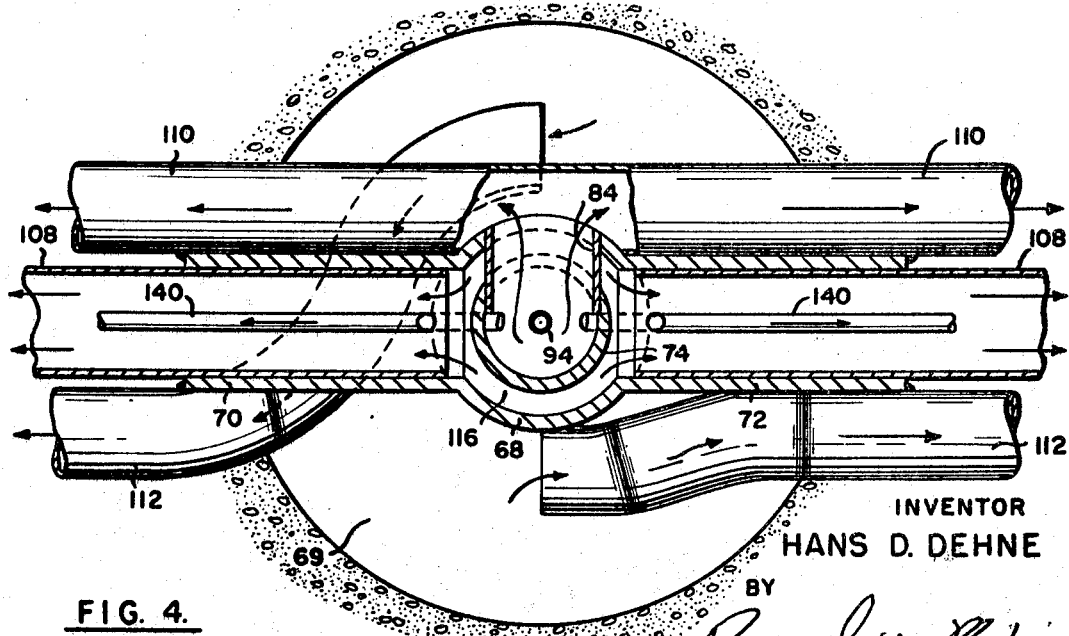
FIGURE 4 is a top view of the detail shown in FIGURE 3 with portions broken away for illustrative purposes.

Referring to FIGURE 3, the supply head 60 comprises a body including a pair of tubes 66 and 68 extending vertically and secured together end-to-end. The supply head body also comprises a pair of horizontal tubes 70 and 72 extending laterally from and secured on upper tube 68. The tube 66 extends within a sludge pit 69 located centrally in the bottom bed of the reactor. The upper end of the supply head 60 including lateral tubes 70 and 72 are located above the bottom wall of the reactor. The supply head body also includes a tubular insert 74 positioned within the tube 68 in concentric relation therewith and supported by a flange 76 secured on the upper end of tube 68. A chamber 78 is defined between a transverse disc 80 within the inner tube 68 and a plate 82 mounted on the upper end of flange 76. A horizontal tube 84 is mounted in tube 68 and insert 74 to provide communication between the interior of insert 74 and the exterior of tube 110 (FIGURE 4).

The structure comprising vertical tubes 66 and 68, lateral tubes 70, 72 and 84, insert 74 and the connecting parts of the supply head body are mounted for rotatable movement within the thrust bearing means 86 which rotatably supports the flange 88 on the bottom end of tube 66 as is best shown in FIGURE 3. A radial bearing means 90, such as a bushing, is positioned between the fixed vertically extending end of pipe 56 and the lower end of tube 66 whereby the pipe 56 serves as the lateral support for the tube 66 and the parts secured thereto. The vertical terminal portion of pipe 62 is concentric with the vertical end of pipe 56 and extends therein as shown in FIGURE 3. The upper end of pipe 62 extends within the lower end of insert 74 with a radial bearing 92, or bushing, being positioned therebetween.

There is provided a pipe 94 which at its lower end communicates with a small bore 96 in the thrust bearing 86 and at its upper end communicates with the chamber 78. A pipe 98 from the raw water supply extends into communication with the bore 96. A small port 100 within the thrust bearing connects the bore 96 with the region in the bearing where the moving flange 88 contacts the bearing for cleaning and lubricating purposes. The pipe 94 delivers the raw water to the upper chamber 78, from which water is delivered to the upper bearing 92 by way of a small passage 102 in insert 74.

The distributor comprises what may be termed a pair of arms 104 and 106 extending radially from the supply head 60 along the reactor bottom to the lower portion of the mixing chamber 30. Each distributing arm 104 and 106 comprises three horizontally extending pipes 108, 110 and 112 which are supported at their inner end by the supply head 60 and rotate as a unit. The pipes 108 for arms 104 and 106 are mounted at one end respectively within the lateral tubes 70 and 72 and at their outer ends have a terminal portion 114 projecting upwardly at an angle to the horizontal. The inner end of each pipe 108 communicates with the annular chamber 116 between the tube 68 and insert 74, which chamber 116 is in communication with the chemical supply pipe 56 by way of tube 66. The upwardly extending portion 114 of each pipe 108 forms a continuation of the flow path therethrough and is open at the end to deliver chemicals passing through the pipe 108 into the mixing chamber 30.

Figure 2:
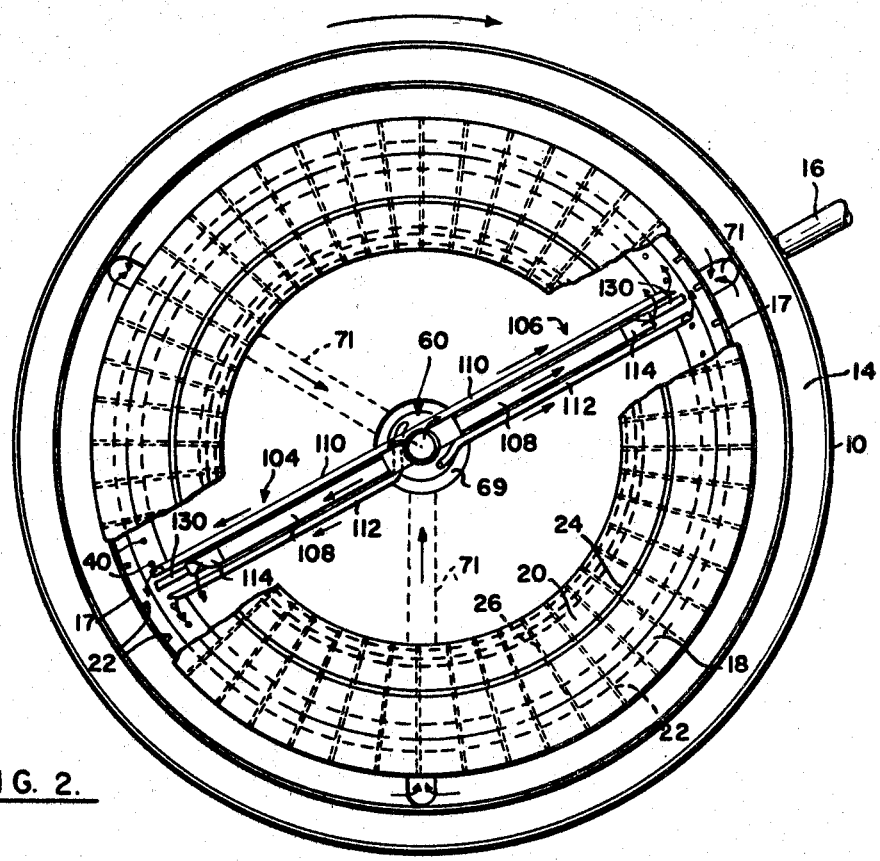
FIGURE 2 is a plan view of the reactor shown in FIGURE 1 with various parts broken away to illustrate features of the invention.

The inner ends of each of the pipes 110 communicate with the interior of tube 84 which communicates at its upstream end with the interior of the insert 74 as shown in FIGURE 4. The pipes 110 also terminate at their outer end in the region of the mixing chamber 30 as shown in FIGURE 2. Thus, chemicals are delivered to the mixing chamber 30 by way of pipe 62, insert 74, pipe 84, and radially extending pipes 110.

The pipes 112 provide means for delivering sludge contained within the sludge pit 28 to the mixing chamber 30. To this end the innermost ends of the pipes 112 are bent downwardly into the sludge pit as is best shown in FIGURES 3 and 4, and the outer ends terminate in the region of the mixing chamber 30 as shown in FIGURES 1 and 2. As will be described more fully hereafter, the rotation of the distributing arms 104 and 106 will serve to cause the sludge to be fed from the sludge pit 69 through the pipes 112 to the region of the mixing chamber 30. The sludge pit 69 receives sludge by way of three radially extending sludge channels 71 formed in the bottom bed as shown in FIGURE 1. The channels are sloped to convey the sludge from the zone 34 to the bottom of the pit 69 by a gravity flow. Of course, more than three sludge channels 71 may be provided if it appears necessary for a particular application. If desired the flow can be regulated by means of an adjustable gate.

Mounted near the end of each pipe 108 in the region beneath the angular portion 114 is a horizontally and radially extending tube 120. The outer end of each tube 120 is closed by a piston member 122 fixedly thereon as by a threaded engagement. A sleeve 124 is mounted on the exterior of tube 120 for axial sliding movement thereon. The outer end of the sleeve 124 is closed by a cap 126 whereby a closed chamber 128 is formed within the sleeve 124 between the piston member 122 and the cap 126. A suitable seal 125 is provided between the sleeve and the piston 122 as is shown in FIGURE 5. Each sleeve 124 carries a blade 130 on its outer end, the blade being secured to the sleeve in a suitable manner such as welding.

A spring 132 is positioned in compression between a shoulder formed on the piston member 122 and a shoulder formed on the movable sleeve 124 whereby the spring 132 biases the sleeve 124 and blade 130 carried thereby inwardly. A pin 134 fixedly mounted on the tube 120 projects radially outwardly through a slot 136 in the sleeve 124. The slot 136 extends at an angle to the axis of the sleeve 124 as is shown in FIGURE 6. Accordingly, the pin 134 in cooperation with the slot 136 serves to determine the angular position of the sleeve 124, and accordingly the blade 130, for an axial position of the sleeve 124 with respect to the tube 120 and the piston member 122. Water under pressure is supplied to the chamber 128 by a line 140 which extends between chamber 78 and the chamber 128 by way of pipe 108, tube 120 and piston member 122. The water pressure serves to position the sleeve 124 in opposition to the action of the spring 132. Accordingly, by varying the pressure applied to the chamber the axial position of the sleeve 124 can be determined. At the same time, this axial position of the sleeve 124 will determine the angular position of the blade 130 by reason of the cooperation of the slot 136 with the pin 134. In other words, the angular position of the blade is dependent upon the water pressure applied to the chamber.

This pressure is supplied through line 98, passage 96, line 94, chamber 78 and line 140. Line 98 which is connected to the pressure supply has a suitable control 142 connected therein for varying the water supply pressure. Of course, various means may be used for providing a variable water supply pressure.

Since the blade 130 is exposed to the upwardly directed flow of the raw water from the pipe 38 through ports 40, a reaction force will be exerted on the blade 130 by this water, driving the distributor arms around the mixing chamber 30 at a rate dependent on the angle of the blade 130 relative to the vertical flow line. Obviously, the greater the angle of the blade with respect to the horizontal the greater the force component in the circumferential direction and the greater the speed of the distributing arms.

In the reactor shown, the blades 130 are positioned to drive the distributing arms 104 and 106 in a clockwise direction as viewed in FIGURE 2.

In the operation of the water treatment reactor in accordance with the invention, the raw water is supplied to the reactor from a suitable supply by way of line 36. The water is supplied to the upper portion of the mixing chamber by line 42 and circular distributing pipe 28, the water leaving pipe 28 by way of the ports 44 and entering the mixing chamber in a manner indicated by the arrows in FIGURE 1. Water is also supplied to the mixing chamber 30 by way of circular distributing pipe 38 located at the lower portion of the mixing chamber 30 and delivering the water in an upward direction by way of the ports 40. By insuring that the velocity of the water entering the mixing chamber is sufficient and by reason of the cooperation of this water with the conical shape of the upper portion of the mixing chamber 30, a vortex-type flow is produced, this rotating in the upper portion of the chamber 30 in generally vertical planes (see arrows in FIGURE 1). Desirably, the liquid mass will rotate several times in the mixing zone 30 before flowing downwardly through passage 50 toward the center of the tank. The flow of the water through the ports 40 also serves to cause rotation of the distributing arms in the manner described previously and at a rate determined by the angular position of the blades 130 as was described above.

Chemicals of the desired type are delivered to the mixing chamber 30 by the various chemical supply conduits described above. One type of chemical is delivered to the mixing chamber by way of pipe 56, tubes 66 and 68, chamber 116, pipes 108 and the outlet portions 114 of these pipes 108. Another type of chemical is delivered to the mixing chamber by way of line 62, insert 74, tube 84, and radially extending pipes 110 on the distributing arms 104 and 106. A third type of chemical may be supplied to the mixing chamber by way of the pipe 52 and the circular distributing pipe 24.

In order to aid in the buildup of the size of the floc in accordance with well-known procedures, sludge is also delivered to the mixing chamber 30. To this end, the sludge pit 69 is supplied with sludge from the dense sludge chamber 34 by way of the three gravity flow pipes 71. The sludge in the sludge pit 69 is transported to the mixing chamber by the pipes 112. It will be noted that as the distributing arms rotate in a clockwise direction as viewed in FIGURES 2 and 4, the open inner ends of the pipes 112 extending into the sludge pit 69 will be moved through the sludge so that the sludge will be forced up through the downwardly extending portion of the pipes 112 into the horizontally extending portion. A combination of this pumping-type action and the centrifugal action by reason of the rotating distributing arms serves to cause the sludge to flow to the outer ends of the pipes 112 whereat they are delivered to the mixing chamber 30.

It will thus be apparent that the distributing means in accordance with the invention delivers both chemicals and sludge to the mixing chamber throughout the circumferential extent thereof.

It will be noted that all the various pipes for delivering chemicals and sludge to the mixing chamber terminate in the same general region where the raw water enters the mixing chamber by way of the ports 40. Also, it is noted that, as shown in FIGURE 1, the distributing ends of the pipes 108 and 112 of distributing arm 104 and the distributing ends of pipes 108 and 110 of distributing arm 106, which are located on the trailing side of the blades 130, are open to face in the direction opposite to that of rotation of the distributing arms. On the other hand, the terminal opening of pipe 110 of distributing arm 104 and of pipe 112 of distributing arm 106, which are on the leading side of the blades 130, are open in an upward direction. This arrangement supports the effluence of fluid out of the distributor and prevents the undue disturbance of the flow around the blades.

The raw water flowing from pipes 28 and 38 intermixes with the chemicals and the sludge delivered to the mixing chamber and the mixture passes through the annular opening 50 at the bottom of the mixing chamber 30 and flows upwardly through a sludge blanket formed in the zone 32. During operation, the sludge blanket is formed in accordance with well-known principles of operation of reactors of the present type, and functions to support the growing of larger size floc particles. The raw water continues to flow upwardly and radially outwardly to the top of the tank 10 with the clear water flowing over the top of the launder 14 and the heavy particles of floc dropping off and accumulating either in the sludge blanket or in the dense sludge zone 34. The clear water or effluent is discharged from the reactor by way of the line 16.

It will be apparent from the foregoing that the reactor has almost unrestricted control of the various phases. For example, the regulating valves 46 and 48 may be adjusted to control the speed of the vortex-type flow action within the mixing chamber 30 as well as the rate of the raw water supply. Moreover, valves 64 and 58 may be adjusted to regulate the amount of chemicals being added. Furthermore, a control means 142 may be adjusted to vary an angular position of the blades 130 and, accordingly, the speed of rotation of the distributing arms 104 and 106 in the manner described previously. All these controls permit a very effective control of the operation of the reactor.

It will be evident that the construction in accordance with the invention provides separated zones within the reactor. For example, the conical hoods 18 and 20 enclose a separated mixing zone 30 and provide a separated zone 32 for the formation of the sludge blanket. Moreover, there is provided a separated zone 34 where the dense sludge may accumulate without interfering with the other zones of the reactor. Moreover, this desirable feature is achieved by a construction involving a minimum of cost.

Another feature of the invention is that by reason of the particular hydraulic drive for the distributor, this drive does not require any electric motor drive or gearing, or the necessary structure for achieving access to and support of such a mechanical drive.

In connection with the control aspects of the invention, it will be noted that at any time during operation, and independently of the raw water supply, the amount of chemicals and sludge being added to the mixing zone can be varied by simply changing the speed of the distributing means (by adjusting the angle of the blades 130 as described above).

Furthermore, it is noted that the vortex-type flow of the water in the upper portion of the mixing chamber is maintained in a generally vertical plane and, accordingly, does not have any radial component wherefore it is not possible to develop any type of circular flow within the reactor, which would be undesirable. Moreover, it is noted that the entire flow pattern through the reactor eliminates the necessity of any baffle plates in order to stop any rotating peripheral flow within the tank. In other words, the flow pattern involved in the reactor does not have any radial component and therefore would not develop into any rotating flow pattern.

Another feature of the reactor construction in accordance with the invention is that the various chemicals employed are separated until the point where they are delivered into the mixing chamber. This avoids clogging up of the lines.

A still further feature of the invention is that it is possible to clean the whole system merely by flowing clear water therethrough in the same direction as the normal flow. Accordingly, there is no need for any backwashing action in order to clean the reactor.

Another feature of the invention is that the hood construction may be made with very thin walls since there is essentially no pressure difference on the opposite sides of the hoods. In fact, the various plates forming the hoods may even be made of plastic.

It will be apparent that various changes may be made in the construction and arrangement of the parts without departing from the scope of the invention. Accordingly, it is not desired to be limited except as required by the following claims.

What is claimed is:

1. A reactor for the treatment of water comprising a vertically extending tank, a wall means having a portion extending upwardly from the tank bottom and defining a generally annular mixing chamber near the tank bottom, means for delivering raw water to said mixing chamber at locations throughout the circumferential extent thereof, and means separate from said raw water delivering means for delivering chemicals to said mixing chamber at locations throughout the circumferential extent thereof, and outlet means for delivery clarified effluent from said tank, said chemical delivery means comprising a distributing means mounted for rotation along the tank bottom within said wall means and having a pair of radially extending arms terminating at their outer ends in the region of said mixing chamber, each of said distributing arms comprising a conduit for delivering chemicals to said mixing chamber, and means for causing rotation of said distributing arms with said ends moving along the circumferential extent of said mixing chamber.

2. A reactor for the treatment of water comprising a vertically extending tank, a wall means having a first portion extending upwardly from the tank bottom and surrounding a zone within the tank and a second portion extending inwardly and downwardly from said first wall portion whereby said wall means defines a generally annular mixing chamber near the tank bottom, means for delivery raw water to said mixing chamber at locations throughout the circumferential extent thereof, and means for delivering chemicals to said mixing chamber at locations throughout the circumferential extent thereof, and outlet means for delivering clarified effluent from said tank, said chemical delivery means comprising a distributing means mounted for rotation on the tank bottom at a central location within said wall means and having a pair of radially extending arms terminating at their outer ends in the region of said mixing chamber, each of said distributing arms comprising a pair of separate conduits for delivering different chemicals to said mixing chamber, and means for causing rotation of said distributing arms with said ends moving along the circumferential extent of said mixing chamber.

3. A reactor according to claim 2 wherein said means for causing rotation of said distributing arms includes a pair of blades each of which is mounted on one of said arms and is positioned to be impinged upon by raw water delivered to said mixing chamber, said blades being positioned in angular relation to said raw water flow so that the reaction force of said impingement causes movement of said blades and said distributing arms around said mixing chamber.

4. A reactor according to claim 3 comprising means for varying the angular position of said blades to vary the reaction force delivered to said blades by said raw water flow.

5. A reactor for the treatment of water comprising a vertically extending tank having an inner wall, a wall means having a first circular portion extending upwardly and inwardly from the tank bottom and a second circular portion extending inwardly and downwardly from said first wall portion whereby said wall means defines a generally annular mixing chamber between said wall portions near the tank bottom, means for delivering raw water to said mixing chamber, said second wall means portion defining a horizontally extending zone inwardly thereof through which liquid passing from the mixing chamber may pass as it leaves the mixing chamber, said first wall means portion being spaced radially from the inner wall of said tank thereby to define in cooperation with the inner wall of the tank a generally annular chamber externally of said first wall means portion defining a dense sludge zone for receiving dense sludge, the lower end of said second wall means portion being spaced above the tank bottom to provide an annular passage through which liquid leaving said mixing chamber flows to said horizontal zone, separate conduit means for feeding chemicals directly to said mixing chamber, and outlet means for delivering clarified effluent from said tank.

6. A reactor according to claim 5 wherein said outlet means comprises launder means at the upper end of said tank for receiving the treated water for delivery from the tank, said raw water delivery means comprises means for delivering raw water to said annular mixing chamber at locations throughout the circumferential extent thereof, and said chemical feeding means comprises means for delivering chemicals to said annular mixing chamber at locations throughout the circumferential extent thereof.

7. A reactor according to claim 5 comprising means for supplying sludge to said mixing chamber, said sludge supplying means comprising a sludge pit formed in the bottom of said tank, conduit means for delivering dense sludge from said dense sludge zone to said sludge pit, and conduit means for transmitting the sludge from said sludge pit to said mixing chamber at locations throughout the circumferential extent of said mixing chamber.

8. A reactor according to claim 6 comprising means for supplying sludge to said mixing chamber, said sludge supplying means comprising a sludge pit formed in the bottom of said tank, conduit means for delivering dense sludge from said dense sludge zone to said sludge pit by gravity flow, and conduit means for transmitting the sludge from said sludge pit to said mixing chamber at locations throughout the circumferential extent of said mixing chamber.

9. A reactor for the treatment of water comprising a vertically extending tank, a wall means having a first portion extending upwardly from the tank bottom and surrounding a zone within the tank and a second portion extending inwardly and downwardly from said first wall portion whereby said wall means defines a generally annular mixing chamber near the tank bottom, means for delivering raw water to said mixing chamber, means delivering chemicals to said mixing chamber comprising a distributing means mounted for rotation on the tank bottom at a central location within said wall means and having a pair of radially extending arms terminating at their outer ends in the region of said mixing chamber, each of said distributing arms comprising a pair of separate conduits for delivering different chemicals to said mixing chamber, means for causing rotation of said distributing arms with said ends moving along the circumferential extent of said mixing chamber, and means for supplying sludge to said mixing chamber, said sludge supplying means comprising a dense sludge zone defined between said first wall portion and said tank, a sludge pit formed in the bottom of said tank, conduit means for delivering dense sludge from said dense sludge zone to said sludge pit, conduit means for transmitting the sludge from said sludge pit along said distributing arms to said mixing chamber at the end of said distributing arms whereby said sludge is distributed throughout the circumferential extent of said mixing chamber, and outlet means for delivering clarified effluent from said tank.

10. A reactor according to claim 9 wherein said distributing means comprises a supply head mounted for rotation at a central location, said distributing arms being mounted on said supply head, said supply head providing communication with the inner ends of said distributing conduits for conveying said chemicals.

11. A reactor according to claim 9 wherein said raw water delivery means comprising conduit means conforming generally to the shape of said mixing chamber and arranged to deliver raw water into said mixing chamber in vertical planes.

12. A reactor according to claim 11 wherein said first and second wall portions are conical and join at an apex at the upper ends thereof, said raw water being directed along vertical planes into said wall portions so that a generally vortex flow is produced within said mixing chamber.

References Cited

UNITED STATES PATENTS

| | | | |
|---|---|---|---|
| 2,444,671 | 7/1948 | Prager | 210—208 X |
| 2,678,914 | 5/1954 | Kalinske | 210—502 X |
| 2,787,378 | 4/1957 | Battey | 210—502 X |
| 2,829,776 | 4/1958 | Lawlor | 210—208 X |
| 2,969,149 | 1/1961 | Mackrle et al. | 210—195 |

SAMIH N. ZAHARNA, *Primary Examiner.*

REUBEN FRIEDMAN, *Examiner.*

J. L. DE CESARE, *Assistant Examiner.*